(No Model.) 2 Sheets—Sheet 1.
O. H. JEWELL.
APPARATUS FOR FEEDING CHEMICALS TO FILTERS.
No. 377,758. Patented Feb. 14, 1888.
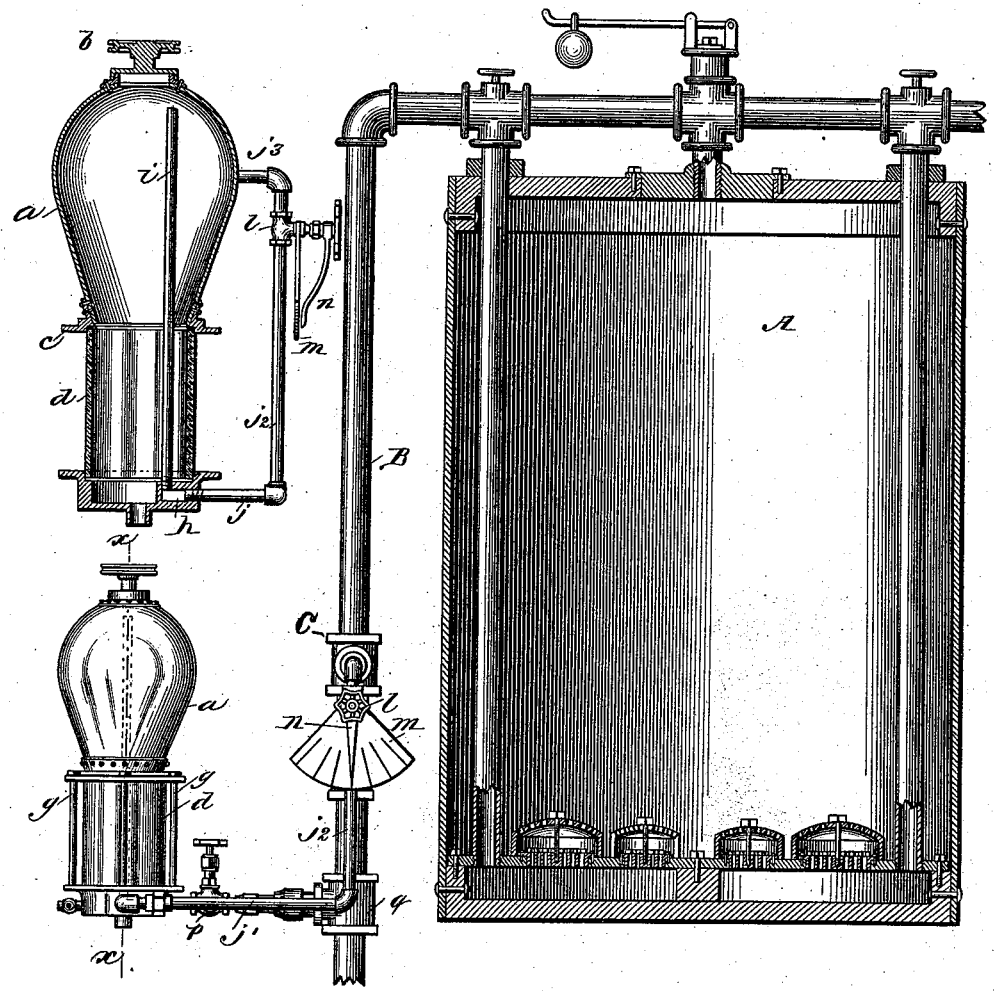

(No Model.) 2 Sheets—Sheet 2.

O. H. JEWELL.
APPARATUS FOR FEEDING CHEMICALS TO FILTERS.

No. 377,758. Patented Feb. 14, 1888.

Witnesses
Inventor
Omar H. Jewell
By Wm H Lotz
Atty.

UNITED STATES PATENT OFFICE.

OMAR H. JEWELL, OF CHICAGO, ILLINOIS.

APPARATUS FOR FEEDING CHEMICALS TO FILTERS.

SPECIFICATION forming part of Letters Patent No. 377,759, dated February 14, 1888.

Application filed October 4, 1887. Serial No. 251,475. (No model.)

*To all whom it may concern:*

Be it known that I, OMAR H. JEWELL, a citizen of the United States of America, residing at Chicago, in the county of Cook and State of Illinois, have invented certain new and useful Improvements in Attachments to Feed-Water Purifiers or Filtering Apparatus, of which the following is a specification, reference being had therein to the accompanying drawings.

This invention relates to devices for filtering and purifying water for feeding steam-boilers and for other purposes, and, more particularly, it relates to attachments to filtering apparatus for automatically mixing with the water before it passes into the filter a solution of alum or other chemicals adapted to precipitate the impurities contained therein; and it has been my object to produce such an apparatus as an attachment to filters from which the chemicals will be fed to the water in uniform quantities only while the filter is supplied with water; and with that object in view my invention consists of the novel devices and combinations of devices hereinafter described and specifically claimed.

Figure 3:
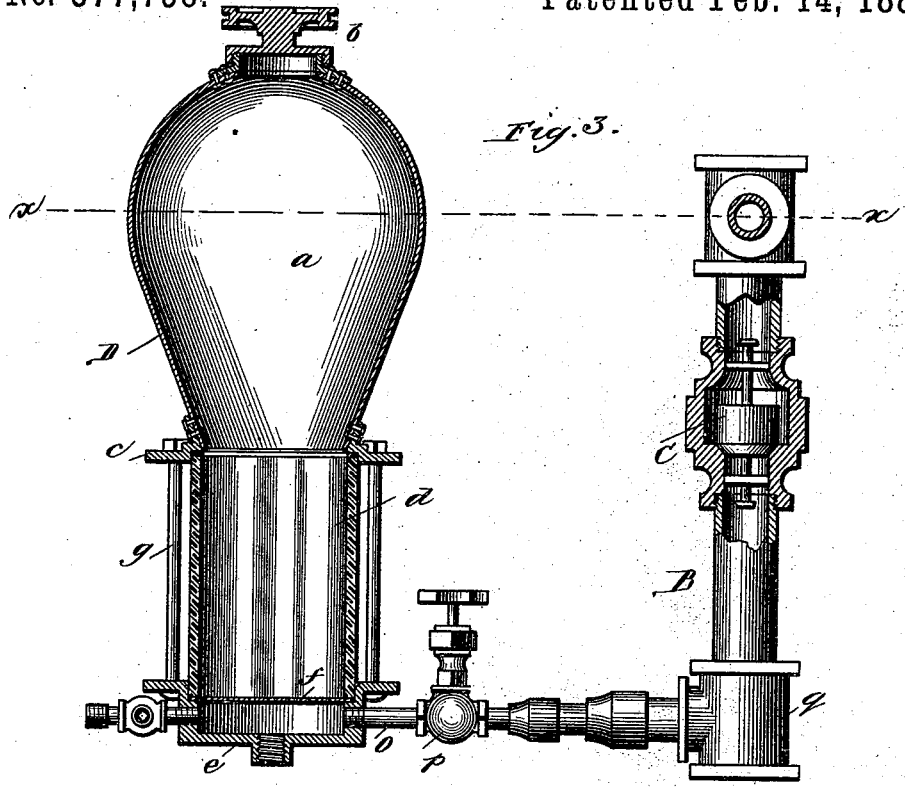
Figure 4:
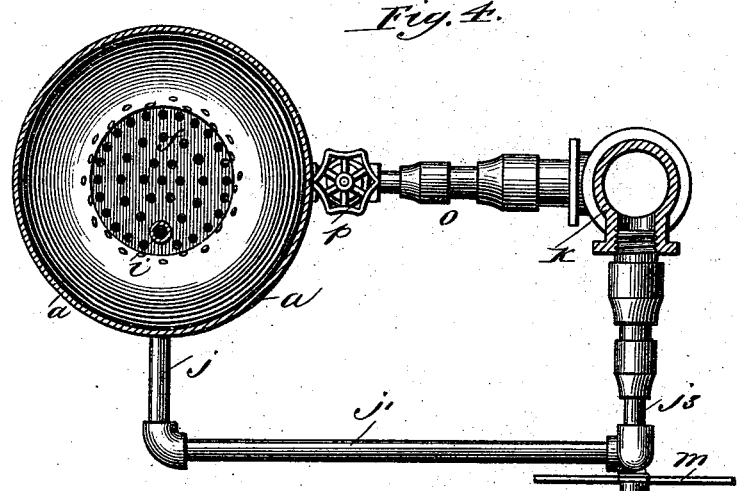

In the accompanying drawings, Figure 1 represents a sectional view of a filter having my chemical feed apparatus attached; Fig. 2, a cross-section of the chemical feeder; Fig. 3, a longitudinal section of the same on an enlarged scale; and Fig. 4 a plan, partly in section, on line $x$ $x$ in Fig. 3.

Corresponding referential characters in the several figures of the drawings designate like parts.

A denotes the filtering-tank, that may be of any usual construction, to be filled with gravel and sand, through which the water is to filter either in an up or a down direction, as may be desirable; and no claims being made in this application on the novelty of its construction and arrangement, I will not describe it in detail.

B is the supply-pipe for the filtering apparatus A, either leading from a pump or from a reservoir. This supply-pipe is provided with a check-valve, C, Fig. 3, that will prevent a reverse current of the water, and which may be made heavy for providing a certain amount of resistance to the water by its gravity.

D is the chemical receptacle, composed of a globe, $a$, made of sheet metal and provided on its upper end with a screw-cap, $b$, the lower end of globe $a$ having secured to it an annular flange, $c$, that forms a socket for the upper end of a glass tube, $d$. The base $e$ of this receptacle also provides a socket for the lower end of the glass tube $d$ and for the circumferential edge of a perforated diaphragm, $f$. Bolts $g$ are passed through holes in flange $c$ and in the flange of base $e$ for clamping the glass tube $d$ between. The base $e$ is provided in one side with a small chamber, $h$, into which is tapped the lower end of vertical pipe $i$, extending through perforated diaphragm $f$ to near the top of globe $a$ inside of the receptacle D. From the side is also tapped into chamber $h$ a horizontal pipe, $j$, which, through such chamber $h$, communicates with vertical pipe $i$. This pipe $j$, through pipes $j'$ $j^2$ $j^3$, communicates with pipe B above check-valve C by pipe $j^3$ being screwed into a T-coupling, K, of pipe B. Pipe $i^2$ has a globular stop-valve, $l$, the casing of which is provided with a segmental dial, $m$, graduated, and the valve-stem of which has a pointer, $n$, indicating the degree of opening of such valve. Another pipe, $o$, provided with globular valve $p$, is tapped into base $e$ of receptacle D, and is connected with pipe B in a T-coupling, $q$, below check-valve C. The valve $r$, tapped into base $e$ of receptacle D, is for emptying the same, and the screw-nozzle $s$ is to be closed with a screw-plug.

The receptacle D having been filled through its top opening with alum or other suitable chemicals, which opening is closed again with screw-cap $b$, and the valves $l$ $p$ being partly opened to the desired extent, the gravity of valve C will produce a sufficient resistance to the water for part of it to follow the more circuitous passage through pipe $l$ into the receptacle D, and after this is filled to above the top end of pipe $i$, to pass down through such pipe $i$, and thence through pipes $j$, $j'$, $j^2$, and $j^3$ into the pipe B, again above check-valve C, the adjustment of valves $l$ and $p$ limiting the amount of water thus circulated through such receptacle D, the chemicals in which slowly dissolving, a small proportion of solution of such chemicals will be continuously supplied to the water to be filtered on its passage through pipe B, and will be thoroughly mixed therewith before entering the filtering-tank A.

What I claim is—

1. The combination, with a filtering tank or reservoir and with the supply-pipe thereof provided with a gravitating check-valve, of a receptacle for chemicals and of water-circulating pipes connecting the same with the supply-pipe, one above and one below the gravitating check-valve, substantially as and for the purpose set forth.

2. The combination, with a filtering tank or reservoir and with the supply-pipe thereof provided with a gravitating check-valve, of a receptacle for chemicals composed of a glass tube clamped between the top globe and the base, and communicating through such base by two pipes with the supply-pipe at opposite sides of the check-valve thereof, all substantially as and for the purpose set forth.

3. As an attachment to a water-filter having supply-pipe B, with gravitating check-valve C, the receptacle D, composed of globe $a$, glass tube $d$, and base $e$, and provided with screw-cap $b$ and vertical pipe $i$, and connected with the supply-pipe B by pipe $j$, communicating with pipe $i$ and with pipe B above valve C, and by pipe $o$, communicating with pipe B below valve C, each pipe $j$ and $o$ being provided with a stop-valve, all substantially as set forth, to operate as specified.

In testimony whereof I affix my signature in presence of two witnesses.

OMAR H. JEWELL.

Witnesses:
WILLIAM H. LOTZ,
OTTO LUBKERT.